Jan. 18, 1955    H. P. MUNGER    2,699,679
ATMOSPHERIC CONTAMINANT COLLECTOR
Filed Jan. 9, 1951    3 Sheets-Sheet 1

INVENTOR.
Hamnett P. Munger
BY Adams, Stevens + Mase
AGENTS.

Jan. 18, 1955    H. P. MUNGER    2,699,679
ATMOSPHERIC CONTAMINANT COLLECTOR
Filed Jan. 9, 1951    3 Sheets-Sheet 2
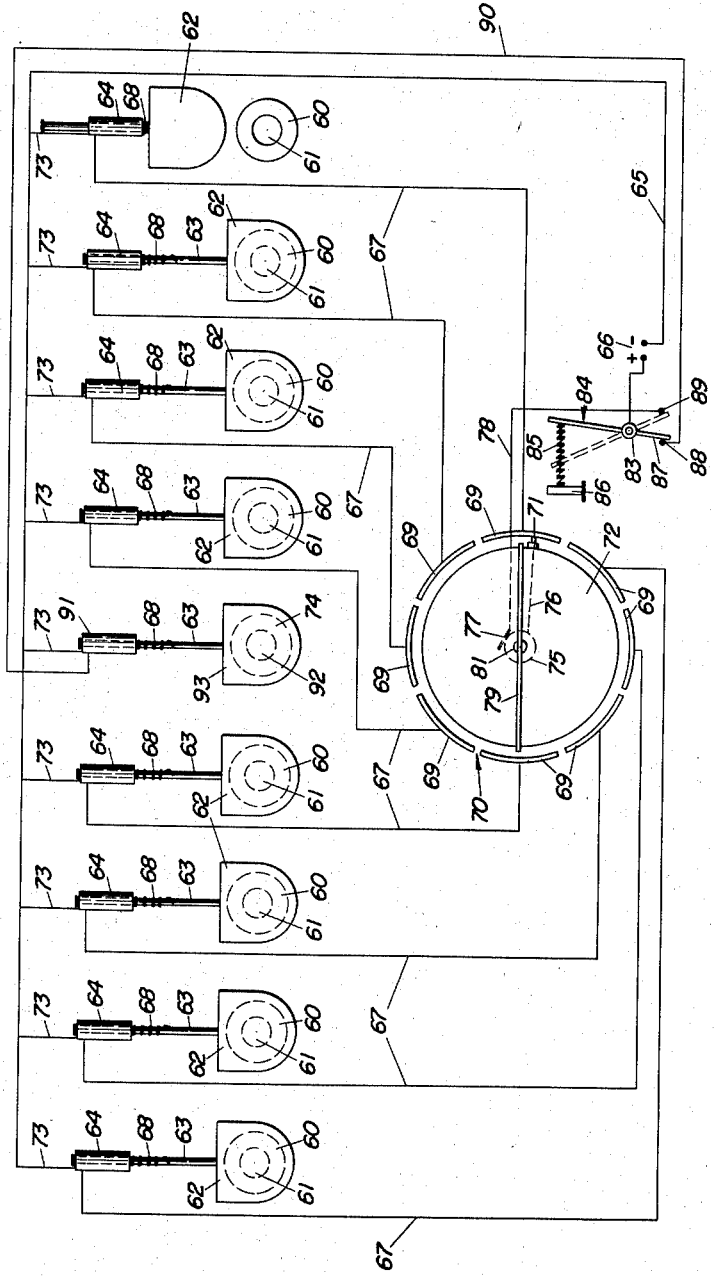
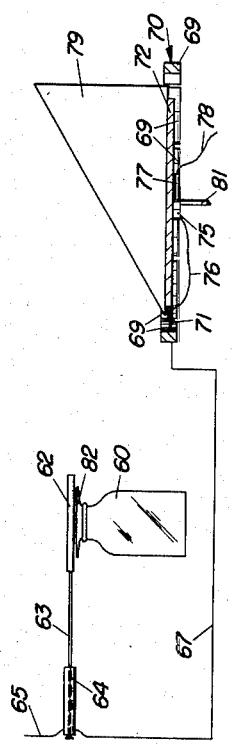
INVENTOR.
Hamnett P. Munger
BY Adams, Stevens + Mase
AGENTS.

Jan. 18, 1955     H. P. MUNGER     2,699,679
ATMOSPHERIC CONTAMINANT COLLECTOR
Filed Jan. 9, 1951     3 Sheets-Sheet 3

INVENTOR.
Hamnett P. Munger

BY Adams, Stevens & Mase

AGENTS.

United States Patent Office 2,699,679
Patented Jan. 18, 1955

2,699,679

ATMOSPHERIC CONTAMINANT COLLECTOR

Hamnett P. Munger, Columbus, Ohio, assignor, by mesne assignments, to The Battelle Development Corporation, Columbus, Ohio, a corporation of Delaware Application January 9, 1951, Serial No. 205,099

9 Claims. (Cl. 73—425.2)

This invention relates to atmospheric pollution, and, more particularly, to a device adapted to selectively collect certain constituents of the atmosphere.

The study of the factors influencing pollution of the atmosphere is today enjoying the interest of municipalities and civic organizations to a greater extent than at any previous time. Due to the interest of an awakened populace, as evidenced by the various ordinances passed by many municipalities, the development of tools which may be of use in solving the problems associated with atmospheric pollution has received a great impetus.

Two of the primary contaminants of the atmosphere are solid particulate matter, commonly referred to as dust, and gaseous materials. In an area having a plurality of sources of such contaminants, it is extremely desirable to know the course taken by such contaminants, and where they will be deposited. For instance, it might be desirable to be able to ascertain whether the dirt fall in a certain area comes from a foundry nearby, or from a foundry miles away. The same thing is true of noxious gases.

There have been attempts, in the prior art, to provide devices which would collect certain constituents of the atmosphere. By means of complex recording mechanisms, and correlation with weather reports for a similar period, it was possible to obtain an approximate determination as to what contaminants were present in, or precipitated from, the atmosphere at a particular time. However, none of these devices in the prior art has attempted to collect and segregate these constituents, with reference to the velocity and/or the direction of the wind.

It is, therefore, one object of this invention to provide a device capable of collecting constituents from the atmosphere and segregating such constituents, depending upon the velocity and the direction of the wind.

It is another object of this invention to provide such a device capable of collecting and segregating solid constituents of the atmosphere.

It is still another object of this invention to provide a device capable of collecting and segregating gaseous constituents of the atmosphere.

Various additional objects and advantageous features of this invention will become apparent from the following description, when read in conjunction with the accompanying drawings, wherein Fig. 1 is a perspective view, partly in section, with portions broken away, of a device constituting a portion of this invention;

Fig. 2 is a partial schematic plan view of a modification of this device, showing the various electrical connections;

Fig. 3 is a side-elevation view of a portion of the device shown in Fig. 2;

Figure 1:
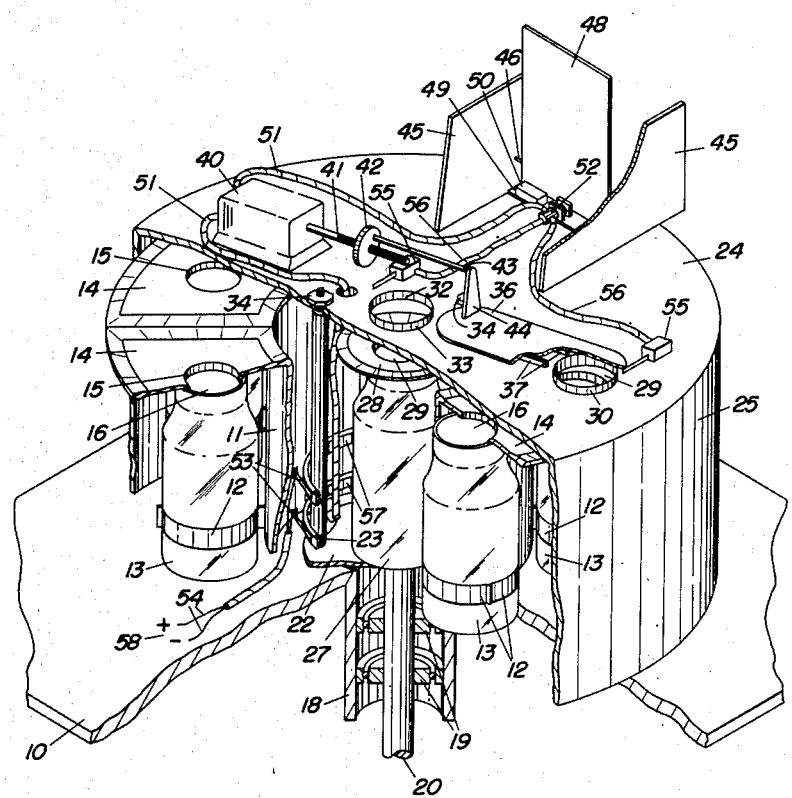

Referring to the drawings and, more particularly, to Fig. 1, the embodiment of the invention shown therein comprises a base-plate 10, on which is fixedly positioned hollow, columnar member 11. Columnar member 11 is provided at fixed intervals with outwardly extending clamps 12—12, which are adapted fixedly to secure jars 13—13. Outwardly extending from the upper edge of columnar member 11 are substantially flat, trough-like sections 14—14, each of which is provided with a centrally disposed opening 15 therein, which is so located as to be in registration with a corresponding opening 16 in jar 13. To insure close cooperation with opening 16 in jar 13, opening 15 in member 14 is preferably formed by downwardly turning the central portion of member 14 to cooperate with opening 16.

Plate 10 is provided with a depending cylindrical portion 18, centrally disposed with respect to columnar member 11. Within portion 18 may be positioned bearings 19—19, and shaft 20 rotatably mounted therein. Shaft 20 supports and rotates with platform 22, which is slightly spaced above plate 10. Upstanding from platform 22 are a plurality of (preferably, four) pillars 23—23, only one of which is completely shown in the drawing. Supported on and adapted to rotate with said pillars is shell 24. Shell 24 preferably has a skirt portion 25 which functions to prevent any solid contaminant matter from the atmosphere from being deposited on trays 14—14 or jars 13—13 other than through means to be hereinafter described. Centrally positioned on platform 22 is jar 27, which may be provided with a trough-like member 28, having a centrally disposed opening 29 therein, which is in registration with the opening in the top of jar 27, similar to the arrangement of jars 13—13 and members 14—14. However, in this case, trough-like member 29 is supported by jar 27 and is not supported by columnar member 11. Likewise, it should be apparent that trough-like members 14—14, instead of being supported by columnar member 11, could as well be supported by jars 13—13. Jar 27 is free to rotate with shell 24 and platform 22, with respect to stationary member 10, columnar member 11, and jars 13—13. On the upper surface of shell 24, which surface is preferably flat, there is provided an opening 29, preferably, as shown, with an upstanding rim 30. Opening 29 is so located that it will be in registration with the openings 15—15 and 16—16 of the trough-like members 14—14 and jars 13—13 when member 24 rotates. Member 24 is provided with a centrally disposed opening 32, also preferably provided with an upstanding rim 33, whose purpose will be hereinafter described. It will be apparent that centrally disposed opening 32 is in registration with opening 29 of trough-like member 28 and the opening in jar 27. Shell 24 may be fixedly secured to pillars 23—23 by means of nuts 34—34, which threadedly engage the ends thereof. A sliding cover 36, of such a length that it can cover either opening 29 or opening 32, is provided, and is adapted to slide on tracks 37—37. Cover member 36 may be slid backwardly and forwardly on tracks 37—37 by reversible electric motor 40, through threaded shaft 41, member 42 which threadedly engages said shaft, and connecting members 43 and 44.

Upstanding from the upper surface of shell 24 are fins 45—45 which function as weathervanes. Instead of the two fins 45—45, it should be apparent that a single fin 45, or more than two fins could be utilized. Moreover, the fins may be larger, with respect to shell 24, than shown. Shaft 46 is fixedly secured in fins 45—45 and supported by, but free to rotate on shaft 46, is flap 48, provided with a shelf 49, on which is counterweight 50, and switch 52. Switch 52 is of a type which will close an electrical circuit when flapper 48 is tilted. Limit switches 55—55, connected by leads 56—56, limit the movement of cover 36, and also alternately reverse the direction of rotation of motor 40. Insulatedly supported by pillars 23—23 are sliprings 57—57, which connect to wires 51—52 which lead to motor 40 and switch 52. Fixedly, but insulatedly, connected to the inner portion of columnar member 11 are brushes 53—53, which may be provided with leads 54—54 which connect to a source of electrical current 58.

For the purposes of atmospheric pollution studies, it is desirable to know the quantity of solid impurities which settle from the air while the wind is blowing from various directions. Moreover, it is also desirable to be able to collect such solid material for later analysis. For example, as long as the wind blows from the northeast quarter, it is desirable to have a device which will collect solid impurities which settle from the atmosphere while the wind is blowing from that direction. Moreover, it is also desirable to collect such solid impurities only when the wind velocity exceeds a certain minimum rate. While this rate will vary from one locality to another, it is generally about 3 miles per hour. When the wind velocity is below this predetermined rate, any solid impurities that precipitate from the atmosphere may be collected in a single container. However, when the wind velocity exceeds this predetermined rate, it is desirable to selectively collect solid impurities which settle from the atmosphere, and segregate such impurities depending upon the wind direction.

To accomplish these desirable results, the device shown in Fig. 1 functions as follows: Depending upon the wind direction, shell 24, its associated platform 22, and jar 27 which are free to revolve, will choose a position dependent upon the wind direction, through the medium of fins 45—45. If the wind velocity is below the predetermined level flap 48 will not be tipped sufficiently to actuate motor 40. Therefore, cover member 36, which normally covers opening 29, will remain in such position leaving opening 32 uncovered. Hence, any solid impurities which settle from the atmosphere during this period of wind velocity; when the wind velocity is below the preselected rate, regardless of the wind direction, will be collected in jar 27, and any particles that fall through opening 32 and do not fall into jar 27 will be collected on trough-like member 28. Trough-like member 28 and trough-like members 14—14 function to collect and segregate any solid particulate matter which does not fall into jar or receptacle 27 or jars or receptacles 13—13.

If the wind velocity exceeds the preselected value, flapper 48 will be tilted sufficiently to cause switch 52 to be closed and electric motor 40 to be started. Electric motor 40 will function to move cover 36 along tracks 37—37 whereby opening 32 will then be covered and opening 29 will be exposed. It will be apparent that the actuating wind velocity may be selected by varying the value of counterweight 50. With opening 29 uncovered, and shell 24 free to rotate with changes in the wind direction, it will be apparent that any solid impurities which settle from the atmosphere will be collected in jars corresponding to the direction of the wind while such matter is settling from the atmosphere. Therefore, each jar will contain the solid impurities for its particular wind direction for the period of time that the device is in operation. If the wind direction drops below the selected value, opening 29 will become covered, and opening 32 will be exposed.

Normally, the device is left untouched for a period of 30 days, and the jars are partially filled with water to insure that any solid materials which are collected remain in the jars. At the end of the 30-day period, shell 24 is removed, a soft camel's-hair brush may be used to brush any solid impurities which have collected on members 14—14 or member 28, into their respective jars, the jars are then removed, and the solid material is weighed and analyzed.

It should be apparent that the use of this device eliminates the recording of wind direction and velocity and the laborious comparison at the end of a test period, with accompanying inaccuracies. Moreover, this device functions to segregate the particulate matter in accordance with wind velocity and wind direction, which had previously not been possible.

Referring now more particularly, to Figs. 2 and 3, there is shown a plurality of jars 60—60 (see Fig. 3) each of which is provided with a substantially horizontally disposed opening 61—61 in the upper portion thereof, each opening being provided with a cover 62, which through a shaft 63, is operated by a solenoid 64. Spring 68—68, attached to solenoid 64—64 and shaft 63—63, is normally biased to urge cover 62 over jar 60. Each of the solenoids 64—64 has one lead 73—73 thereto connected with a common ground 65, which goes to a source of current 66. Separate leads 67—67 from each solenoid go to respective separate segments 69—69 in the segmented ring indicated generally at 70. Cooperating with ring 70 is brush 71, which is fixedly secured to rotatable member 72 and electrically connected to ring 75 by means of lead 76. A brush 77 cooperates with ring 75 and connects to lead 78. Platform 72 has upstanding therefrom a vane 79, which may be exposed to the wind and therefore, depending upon the wind direction, will cause platform 72 to rotate until vane 79 becomes aligned with the direction in which the wind is blowing. Platform 72 rests on shaft 81, which is free to rotate in bearings (not shown). As shown in Fig. 3, jar 60 may be provided with a trough-like member 82, similar to member 28 of Fig. 1.

The positive side of the source of electrical current 66 connects to the fulcrum 83 of flapper 84. Flapper 84 is normally held in the right-hand position by means of spring 85 and support 86. The lower portion 87 of flapper 84 is adapted to conduct electricity and contacts either contact 88 or contact 89. Contact 89 connects to line 78. Contact 88 connects to solenoid 91 through line 90. Solenoid 91 operates the cover for jar 74 which is used to collect solid impurities when the air velocity is below a predetermined rate. While Fig. 2 is somewhat of a schematic drawing, it is to be understood that flapper 84 is preferably positioned on platform 72, with suitable electrical connections, such as slip rings, in order to insure that flapper 84 always faces the wind due to the movement of vane 79. To simplify an understanding of the device, in the drawing, flapper 84 has been shown separately from platform 72 and vane 79.

The operation of this device is as follows: When the wind velocity is below a predetermined rate, flapper 84 will remain in the position shown, and the lower portion thereof will contact point 88. Therefore an electrical circuit will be closed from the positive side of source 66 through contact 88 to solenoid 91 and thence back to common ground 65. With flapper 84 in the position shown, solenoid 91 will be energized and cover 93, associated therewith, will be backed off the opening 92 in jar 74 and jar 74 will then be open to the atmosphere. Moreover, while flapper 84 is in that position it will also be apparent that a circuit cannot be completed to any of the other solenoids through brush 71, since contact 89 is not in contact with the lower portion of flapper 84. Consequently, even though platform 72 rotates, and brush 71 contacts various segments 69—69 of ring 70, no electrical current will flow therethrough, and all of jars 60—60 will remain covered. When the wind rises above a predetermined velocity, flapper 84 will move so that the lower portion thereof contacts point 89, and the circuit to solenoid 91 will be interrupted, the spring associated with solenoid 91 thereby causing cover 93 to move so that the corresponding opening 92 in jar 74 will be covered. In addition, the circuit through segmented ring 70 will be closed, so that, depending upon the wind direction, a corresponding jar will be uncovered. Therefore, as long as the wind velocity is above the predetermined level, a selected jar will be open to receive solid impurities from the atmosphere. Should the wind velocity drop below the predetermined level, all of the jars except jar 74 associated with solenoid 91 will become covered and jar 74 will become uncovered.

Figure 4:
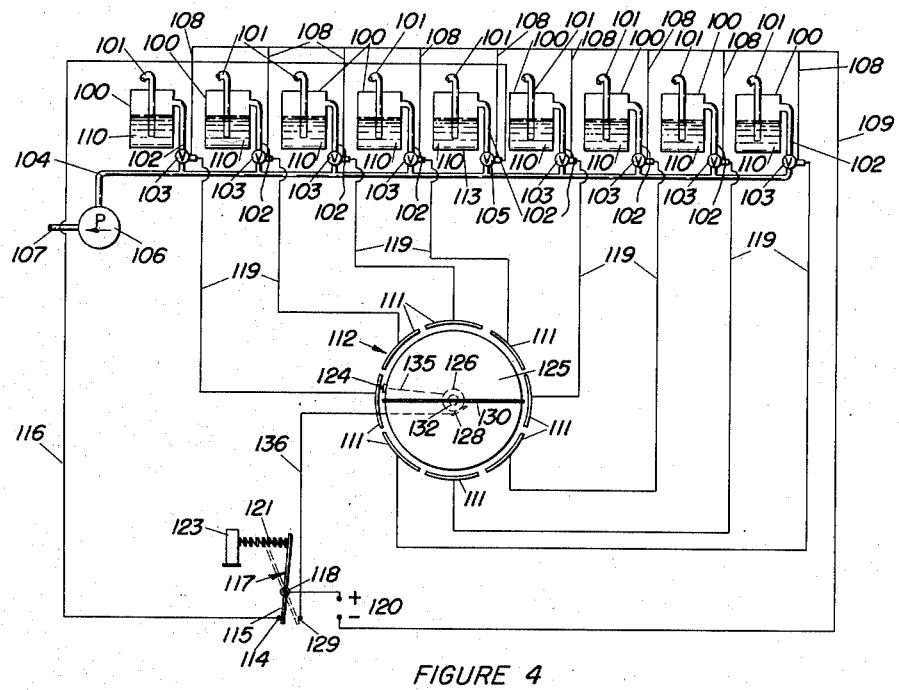
Fig. 4 is a plan view of a further modification of this device, partially schematic, and showing the various electrical connections.
Figure 5:
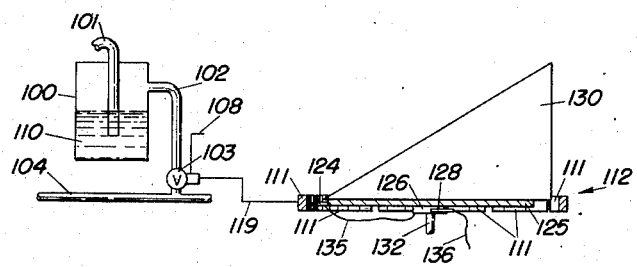
Fig. 5 is a side-elevation view of a portion of Fig. 4.
Figure 6:
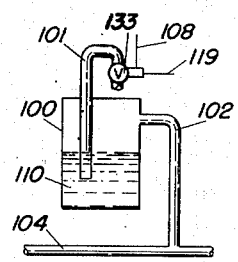
Fig. 6 is a modification of a portion of the device shown in Fig. 5.

Referring now to Figs. 4, 5, and 6, and more particularly to Figs. 4 and 5, 100—100 are containers each of which are provided with an entrance pipe 101, the top of which is preferably overturned, as shown, and which extends into each of containers 100—100 to a point near the bottom thereof. Each of containers 100—100 are provided with an exit pipe 102 which is connected to each of containers 100—100 near the top thereof, each exit pipe connecting through a valve 103 to a manifold 104. The valves 103—103 are preferably solenoid operated valves. Manifold 104 is connected to vacuum pump 106, which is provided with discharge pipe 107. Each of containers 100—100 is filled with a fluid 110 to above the lower point of pipe 101 but not as high as the entrance of pipe 102. The function of this fluid 110 is to absorb, or chemically react with, the particular contaminants in the atmosphere which are being collected, and consequently its nature will vary depending upon the type of materials which are to be studied. Of course, this device will also collect light-weight solid particulate matter and aerosols. Each one of electrical leads 108—108 from each valve 103 connects to ground 109. Each of the other electrical connections 119—119 to each valve 103 leads to a segment 111 of segmented ring, indicated generally at 112, with the exception of lead 116 from preferably the valve 105 for only a single container 113. The lead 116 from the valve 105 associated with this container is connected to contact point 114, which is normally in contact with the lower portion 115 of flapper 117. Flapper 117 is free to move about fulcrum point 118, and the lower section 115 thereof is a conductor of electricity and is connected to the positive side of electrical source 120, similarly to the flapper disclosed in Fig. 2. A spring 121 is provided, normally urging the lower portion of flapper 117 into contact with point 114 and is connected to a support 123. A brush 124, which is adapted to contact segments 111—111 in segmented ring 112, is mounted on rotatable platform 125 and is electrically connected to ring 126 by wire 135. A brush 128 contacts ring 126 and is electrically connected to point 129. Platform 125 has mounted thereon a vane 130 upstanding therefrom. The entire platform 125, ring 126, and vane 130 are supported on shaft 132, which is free to rotate in bearings (not shown).

While Fig. 4 is a schematic drawing, it is to be understood that flapper 117 is preferably positioned on platform 125, with suitable electrical connections, such as slip rings, in order to insure that flapper 117 always faces the wind due to the movement of vane 130. As with Fig. 2, to simplify an understanding of the device, in the drawing flapper 117 has been shown separately from platform 125 and vane 130.

The operation of this device in many ways parallels the operation of the device shown in Figs. 2 and 3, in that the flapper 117, segmented ring 112, and rotatable platform 125 function in much the same way as corresponding elements shown in Fig. 2. With the wind velocity below a predetermined value, the lower section 115 of flapper 117 will be in contact with point 114, thereby completing a circuit through the solenoid valve associated with container 113 and keeping that valve open. Therefore, no matter in what direction the wind blows and platform 125 rotates, all of the remaining containers 100—100, except container 113, will have their corresponding valves closed, and the valve associated with container 113 will be the only valve which is open.

When the wind velocity increases, flapper 117 will move to the position shown in dotted outline and will complete an electrical circuit from the positive side of source of electrical current 120 to point 129 and thence through line 136 to shoe or brush 128 and ring 126 to brush 124. Thereafter, depending upon the direction of the wind, one particular container of containers 100—100 will have the valve associated therewith open. In the meanwhile, solenoid valve 105 associated with container 113 will close since the circuit to that valve has been interrupted.

The opening of a solenoid valve causes a pressure differential to exist between the entrance to container 100 and the exit thereto, causing the atmospheric air to flow therethrough, and any of the desired gases, light-weight particulate material, and aerosols present will be separated by means of the particular liquid in the container. It will be apparent that if the wind velocity is below a certain value such material will only be collected in container 113, and if the wind velocity exceeds a predetermined value one of containers 100—100, associated with that wind direction, will function to collect such material.

In the modification shown in Fig. 6, valve 133 associated with container 100 has been placed on the inlet side of container 100. Since the only pressure differential needed is that necessary to overcome the head of liquid in the container, the fact that a constant vacuum is placed on the liquid in container 100 is not detrimental. Locating the valve in the position shown in Fig. 6 insures that no undesirable solid material will be blown into the opening of container 100. Otherwise, the modification shown in Fig. 6 functions exactly the same as the device shown in Figs. 4 and 5.

It should be apparent that there has been described a device which functions to collect and segregate various contaminants in the atmosphere. In the various modifications of this device, the device can function to collect solid impurities settling out of the atmosphere, or can sample gases in the atmosphere. The device functions not only to collect impurities but also to collect and segregate impurities depending upon the wind direction and the wind velocity.

By using a plurality of these devices in a large industrial area having thousands of sources of contaminants, and using them as monitoring devices, offending sources of contaminants can be readily located.

While this invention has been described in its preferred embodiment, it is understood that the words used are words of description rather than of limitation and that changes within the purview of the appended claims may be made without departing from the true scope and spirit of the invention.

What is claimed is:

1. A sampler adapted to collect certain constituents of the atmosphere; said sampler comprising a first constituent-receiving means and a plurality of second constituent-receiving means, all in relatively close proximity to one another, dual-position valve means for preventing ingress of constituents to said first constituent-receiving means and for permitting constituent accumulation in one of said second constituent-receiving means in a first valve position, and for permitting constituent accumulation in said first constituent-receiving means and for preventing ingress of constituents to all of said second constituent-receiving means in a second valve position; a wind-velocity responsive means; a wind-direction responsive means; and means, connected to said wind-velocity responsive means and said wind-direction responsive means, for actuating said valve means to said second valve position when the wind velocity is at or below a predetermined velocity, and for actuating said valve means to said first valve position when the wind velocity is above said predetermined velocity, said one of said second constituent-receiving means selected for constituent accumulation being dependent upon the wind direction.

2. A sampler adapted to collect certain constituents of the atmosphere; said sampler comprising a first constituent-receiving means and a plurality of second constituent-receiving means, all in relatively close proximity to one another, each of said constituent-receiving means being provided with an opening therein and a cover for said opening, dual position means for placing the cover of said first constituent-receiving means in closed position and for placing the cover of one of said second constituent-receiving means in open position in a first position of said dual position means, and for placing the cover of said first constituent-receiving means in open position and for placing the covers of all of said second constituent-receibing means in closed position in a second position of said dual position means; a wind-velocity responsive means; a wind-direction responsive means; means, connected to said wind-velocity responsive means and said wind-direction responsive means, for actuating said dual position means to said second position when the wind velocity is at or below a predetermined velocity, and for actuating said dual position means to said first position when the wind velocity is above said predetermined velocity, said one of said second constituent-receiving means selected to have its cover placed in open position being dependent upon the wind direction.

3. A sampler adapted to collect solid constituents of the atmosphere; said sampler comprising a rotatable shell provided with a first centrally disposed opening therein, a second opening therein adjacent the periphery thereof; closure means, responsive to the wind velocity, for closing said second opening and for permitting said first opening to remain open when the wind velocity is at or below a predetermined rate, and, alternatively, for closing said first opening and for permitting said second opening to remain open when the wind velocity is above said predetermined rate; a plurality of receptacles, each of which is provided with an opening therein, and so positioned that each of said openings may be in registration with said second opening in said shell, upon rotation thereof; a receptacle, provided with an opening therein adapted to be in registration with said first opening in said shell; and means, responsive to the wind direction, for positioning said shell with respect to said plurality of receptacles, the position of said shell being dependent upon the wind direction.

4. A sampler adapted to collect solid constituents of the atmosphere; said sampler comprising a plurality of equispaced, circumferentially positioned receptacles; a rotatable, substantially planar cover means, slightly vertically spaced above said receptacles; a receptacle, centrally positioned with respect to said receptacles, and adapted to rotate with said cover means; each of said receptacles being provided with a substantially horizontally-extending opening therein; said cover means being provided with a first opening therein adapted to be in registration with the opening in any one of said circumferentially-positioned receptacles, and said cover means being provided with a second opening therein adapted to be in registration with the opening in said centrally positioned receptacle; a closure means for each of the openings in said cover means; means, responsive to the wind velocity, for operating said closure means for said first opening in said cover means, when the wind velocity is at or below a predetermined rate, and for operating said closure means for said second opening in said cover means, when the wind velocity is above said predetermined rate; and means, responsive to the wind direction, for positioning said cover means with respect to said circumferentially-positioned receptacles.

5. The structure set forth in claim 4 wherein the means which is responsive to the wind velocity includes an electric motor and a flapper actuated electrical switch.

6. The structure set forth in claim 4 wherein the means which is responsive to the wind direction includes a fin upstanding from said cover means.

7. A sampler adapted to collect gaseous constituents of the atmosphere; said sampler comprising a plurality of receptacles, each of said receptacles being provided with an opening therein adapted to permit entrance of gaseous constituents of the atmosphere; means for producing a partial vacuum in said receptacles whereby to cause gaseous constituents of the atmosphere to enter therein; valve means associated with each of said receptacles for rendering ineffective the action of said partial vacuum on the receptacle associated with said valve means; means, responsive to the wind velocity, for closing all but one of said valve means when the wind velocity is at or below a predetermined rate, and for closing said one valve means, but not the balance of said valve means, when the wind velocity is above said predetermined rate; and means, responsive to the wind direction, for closing all but one of said balance of said valve means, said one valve means chosen not to be closed being dependent upon the wind direction.

8. The structure set forth in claim 7 wherein each of said receptacles contains a liquid trap.

9. The structure set forth in claim 7 wherein each of said receptacles is provided with a discharge, each of said valve means being located in said discharge; and each of said discharges being connected to said partial vacuum producing means.

References Cited in the file of this patent

FOREIGN PATENTS 592,818    Great Britain  ---------- Sept. 30, 1947